(12) United States Patent
Fujita et al.

(10) Patent No.: US 10,169,263 B2
(45) Date of Patent: *Jan. 1, 2019

(54) MEMORY SUBSYSTEM AND COMPUTER SYSTEM

(71) Applicant: International Business Machines Corporation, Armonk, NY (US)

(72) Inventors: Norio Fujita, Shiga-Ken (JP);
Masahiro Hori, Shiga-ken (JP);
Masahiro Murakami, Kyoto (JP);
Junka Okazawa, Kyoto (JP)

(73) Assignee: International Business Machines Corporation, Armonk, NY (US)

( * ) Notice: Subject to any disclaimer, the term of this patent is extended or adjusted under 35 U.S.C. 154(b) by 209 days.

This patent is subject to a terminal disclaimer.

(21) Appl. No.: 15/215,018

(22) Filed: Jul. 20, 2016

(65) Prior Publication Data

US 2016/0328340 A1    Nov. 10, 2016

Related U.S. Application Data

(63) Continuation of application No. 13/945,330, filed on Jul. 18, 2013, now Pat. No. 9,448,953.

(30) Foreign Application Priority Data

Jul. 19, 2012    (JP) .................................. 2012-160933

(51) Int. Cl.
G06F 1/32    (2006.01)
G06F 3/06    (2006.01)
(Continued)

(52) U.S. Cl.
CPC .......... G06F 13/1689 (2013.01); G06F 1/324 (2013.01); G06F 3/0625 (2013.01);
(Continued)

(58) Field of Classification Search
CPC .............................. G06F 12/161; G06F 13/161
See application file for complete search history.

(56) References Cited

U.S. PATENT DOCUMENTS

| | | | |
|---|---|---|---|
| 6,067,606 A | 5/2000 | Holscher et al. | |
| 8,103,884 B2 | 1/2012 | Brey et al. | |

(Continued)

FOREIGN PATENT DOCUMENTS

| | | | |
|---|---|---|---|
| JP | 2000276436 A | 10/2000 | |
| JP | 2005258533 A | 9/2005 | |

(Continued)

OTHER PUBLICATIONS

Fujita et al.; U.S. Appl. No. 15/215,105, filed Jul. 20, 2016; Entitled "Memory Subsystem and Computer System".

*Primary Examiner* — Tim T Vo
*Assistant Examiner* — Phong H Dang
(74) *Attorney, Agent, or Firm* — L. Jeffrey Kelly

(57) ABSTRACT

A method including estimating an access request frequency from a CPU to a memory subsystem by counting a number of CPU access requests and a number of requests other than CPU access requests, wherein the CPU is connected to the memory subsystem via a system bus, and the memory subsystem includes a memory controller connected to the system bus, and a DDR memory, including the estimated access request frequency with a predetermined threshold value stored in a register, generating a clock gate signal to decimate an operating clock of the memory controller in response to a result of comparing the estimated access request frequency with the predetermined threshold value, generating a dummy cycle signal to delay the timing of signal data output from the memory controller to the system bus, and generating a clock enable signal to decimate an operating clock of the DDR memory.

20 Claims, 3 Drawing Sheets

(51) Int. Cl.
   *G06F 11/30*     (2006.01)
   *G06F 13/16*     (2006.01)
   *G06F 13/40*     (2006.01)
   *G06F 13/42*     (2006.01)
   *G06F 13/364*    (2006.01)

(52) U.S. Cl.
   CPC .......... *G06F 3/0653* (2013.01); *G06F 3/0673* (2013.01); *G06F 11/3027* (2013.01); *G06F 13/161* (2013.01); *G06F 13/364* (2013.01); *G06F 13/4068* (2013.01); *G06F 13/4282* (2013.01); *Y02D 10/14* (2018.01); *Y02D 10/151* (2018.01)

(56) References Cited

U.S. PATENT DOCUMENTS

| | | | |
|---|---|---|---|
| 2005/0201192 A1* | 9/2005 | Honda | G11C 8/18 365/233.11 |
| 2008/0162855 A1 | 7/2008 | Thomas | |
| 2012/0066445 A1 | 3/2012 | Searles et al. | |
| 2014/0025855 A1 | 1/2014 | Fujita et al. | |

FOREIGN PATENT DOCUMENTS

| | | |
|---|---|---|
| JP | 2008-41089 | 2/2008 |
| JP | 2008117068 A | 5/2008 |
| JP | 2008305349 A | 12/2008 |
| JP | 2009081523 A | 4/2009 |
| JP | 2014021785 A | 2/2014 |
| WO | 2007046448 A1 | 4/2007 |
| WO | 2009156447 A2 | 12/2009 |

* cited by examiner

MEMORY SUBSYSTEM AND COMPUTER SYSTEM

BACKGROUND

The present invention relates to a computer system and, more specifically, to saving power in a computer system including a memory subsystem.

In a computer system including a PC or server system equipped with a memory subsystem, saving power is an important factor in reducing the load on, for example, a power source, air conditioner or cooling device. In order to do so, as shown, for example, in U.S. Pat. No. 8,103,884 and Japanese Patent Publication No. 2008-041089, conditions such as the load, capacity utilization rate, and temperature (generated heat) of, for example, a CPU/GPU are monitored, and power saving actively realized in accordance with these conditions.

SUMMARY OF INVENTION

A purpose of the present invention is to realize power savings in a computer system, not by monitoring the operating state of a CPU/GPU or OS, but rather by monitoring the operating state of a memory subsystem via a bus.

Another purpose of the present invention is to realize power savings via memory subsystem hardware without the required intervention of software.

The present invention provides a computer system including a CPU and a memory subsystem connected via a system bus to communicate with each other. This computer system includes a bus monitor connected to the system bus to monitor the frequency of access requests from the CPU to the memory subsystem, and a latency changing means for sending a control signal to the memory subsystem to change the latency of the access requests in response to the frequency of the access requests received from the bus monitor.

The computer system of the present invention is able to monitor the operating state (load) of the memory subsystem by monitoring the frequency of access requests from the CPU in the system bus to the memory subsystem, and can change the latency of access requests according to this operating state (load). As a result, the computer system of the present invention can save power by lengthening the latency of access requests and reducing the processing speed of the system when the operating state (load) of the memory subsystem is low.

The present invention also provides a memory subsystem connected to a CPU via a system bus to communicate with each other. This memory subsystem includes a memory controller connected to the system bus, a DDR memory connected to the memory controller via a DDR-PHY interface (DFI), a bus monitor connected to the system bus to monitor the frequency of access requests from the CPU to the memory subsystem, and a latency changing means for sending a control signal to the memory controller or the DDR memory to change the latency of the access requests in response to the frequency of the access requests received from the bus monitor.

The memory subsystem of the present invention is able to monitor the operating state (load) of the memory subsystem by monitoring the frequency of access requests from the CPU in the system bus to the memory subsystem, and can change the latency of access requests according to this operating state (load). As a result, the memory subsystem of the present invention can save power by lengthening the latency of access requests and reducing the processing speed of the system when the operating state (load) of the memory subsystem is low.

DETAILED DESCRIPTION

Figure 1:
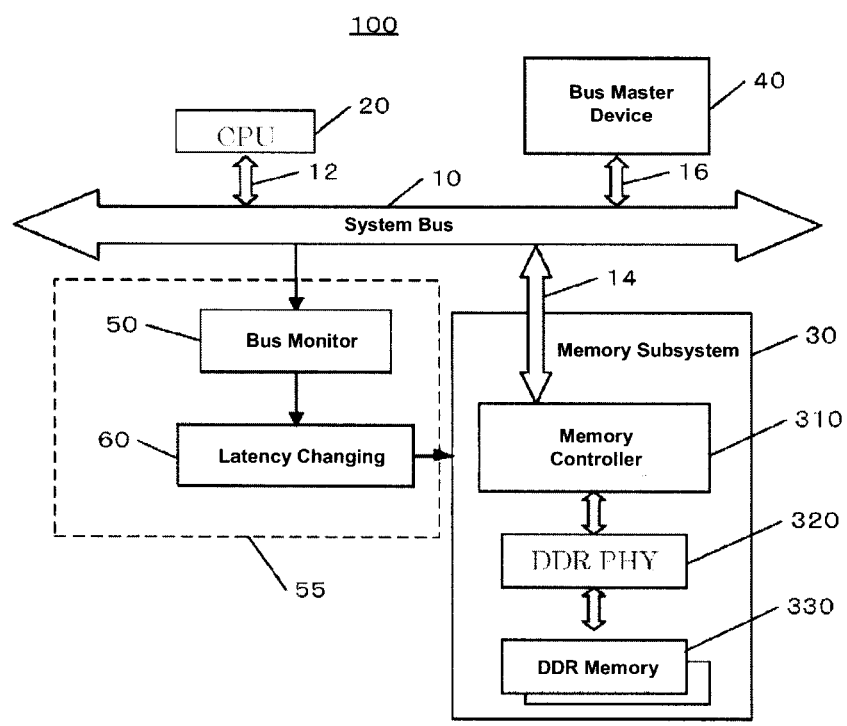
FIG. 1 is a diagram showing a configuration example of a computer system including a memory subsystem of an embodiment of the present invention.

The following is an explanation of an embodiment of the present invention with reference to the drawings. FIG. 1 is a diagram showing a configuration example of a computer system 100 including a memory subsystem of the present invention. The computer system 100 includes a CPU 20, a memory subsystem 30 and a bus master device 40 connected to a system bus 10 via buses 12, 14 and 16, respectively. The computer system 100 also includes a bus monitor 50 and a latency changing means 60. The configuration 55 including the bus monitor 50 and the latency changing means 60 can also be configured as a portion of the memory subsystem 30.

The system bus 10 is composed of a front side bus connected exclusively to the CPU 20, and a memory bus connected to the memory subsystem 30. The CPU 20 can include a graphics processing unit (GPU) or may be a multicore. The bus master device 40 is a device that is able to access the memory subsystem 30 directly, not via the CPU 20.

The memory subsystem 30 includes a memory controller 310, DDR-PHY 320 and a DDR memory 330. The DDR-PHY 320 is one interface specification for a memory controller called a DDR PHY Interface (DFI). The DDR memory 330 means double data rate memory (DRAM) such as DDR2 and DDR3, and is arranged on a plurality of boards depending on the memory capacity. The bus monitor 50 monitors the frequency of access requests from the CPU 20 to the memory subsystem 30. The latency changing means 60 sends control signals to the memory subsystem 30 to change the latency of the access requests in response to the frequency of the access requests received from the bus monitor 50.

Figure 2:
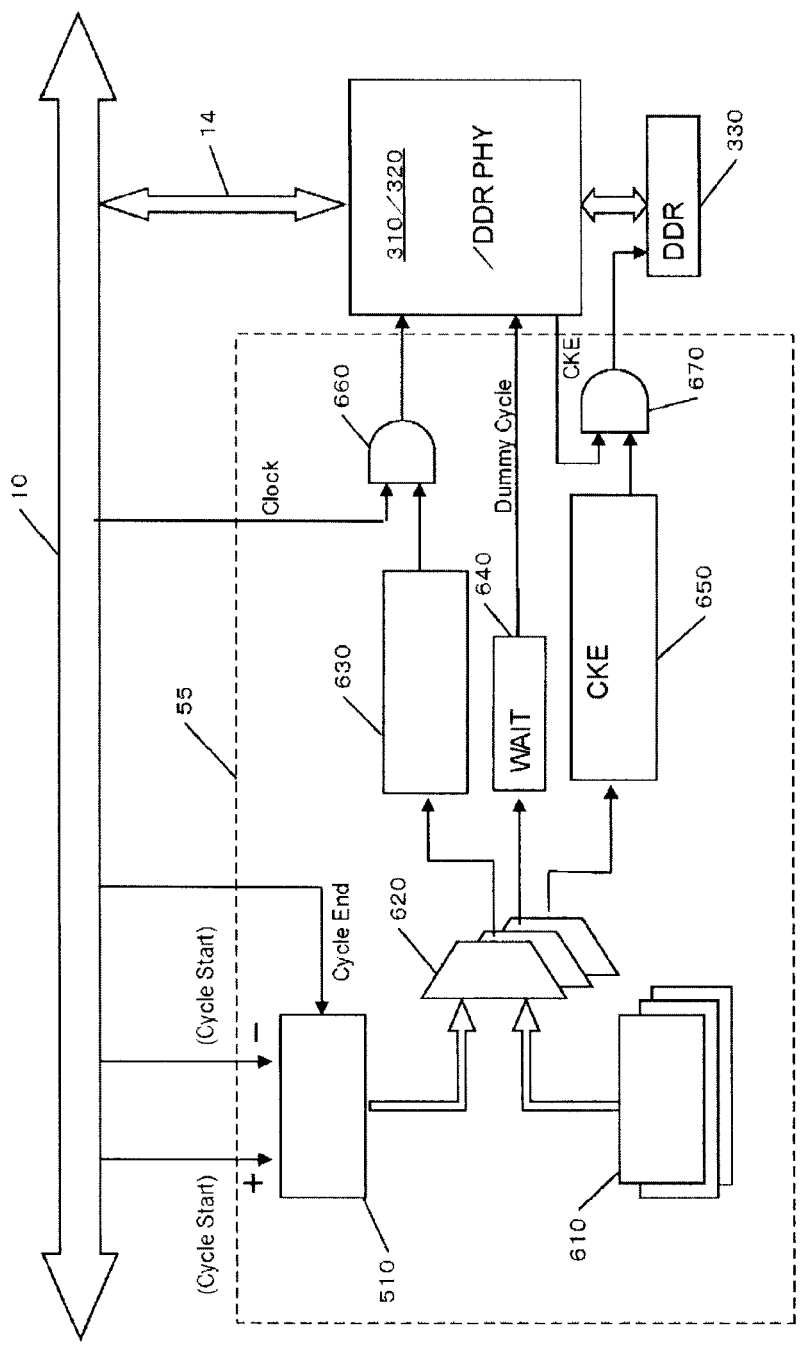
FIG. 2 is a diagram showing a configuration example of a bus monitor and latency changing means of an embodiment of the present invention.

FIG. 2 is a diagram showing a configuration example of a bus monitor 50 and latency changing means 60 of the present invention. The area 55 surrounded by the dashed lines indicates the configuration example of both. As mentioned above, this area 55 can be a portion of the memory subsystem 30. The up/down counter 510 monitors each access request (request signal) to the memory subsystem 30 in the system bus 10. More specifically, the up/down counter 510 counts an access request from the CPU as plus one (+1) and a request other than an access request from the CPU and a system bus 10 idle state as minus one (−1) after a cycle end signal (data transfer end signal) has been received from the system bus 10. The following is a detailed explanation of the counting operation with reference to FIG. 3.

Figure 3:
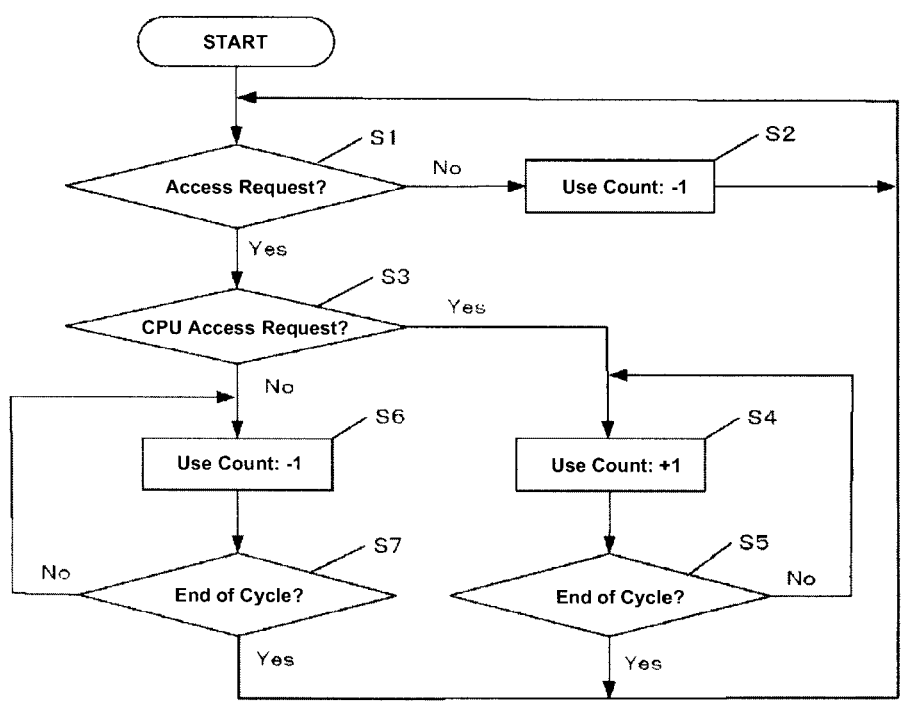
FIG. 3 is a diagram showing an operation flow example of a bus monitor of an embodiment of the present invention.

FIG. 3 is a diagram showing an operation flow example of a bus monitor 50 (up/down counter 510) of the present invention. In Step S1, it is determined whether or not there has been an access request to the memory subsystem 30 in the system bus 10. When there has not been an access request, that is, when the system bus 10 is in an idle state, the count in Step S2 is minus one (−1) indicating non-use. When there has been an access request, it is determined in Step S3 whether or not the access request is a CPU access request.

When there has been a CPU access request, the count in Step S4 is plus one (+1) indicating use. In Step S5, it is determined whether or not the cycle has ended, that is, whether or not CPU access request has ended (data transmission has ended). When the cycle has ended, the process returns to Step S1 where it is determined whether or not there has been an access request. When the cycle has not ended, a plus-one (+1) count is repeated in Step S4.

When there has not been a CPU access request in Step S3, the count in Step S6 is minus one (−1) indicating an access request other than a CPU access request. In Step S7, it is determined in the same manner as Step S5 whether or not the cycle has ended. When the cycle has ended, the process returns to Step S1 where it is determined whether or not there has been an access request. When the cycle has not ended, a minus-one (−1) count is repeated in Step S6. The count value obtained in the flow described above is a value (criterion) for estimating the access request frequency from the CPU 20 in the system bus 10 to the memory subsystem 30, or the occupancy.

Returning to FIG. 2, the count value of the up/down counter 510 is compared by the comparator 620 to a predetermined threshold value stored in the register 610. The count value of the up/down counter 510 serving as the count result is negative, a value of zero is inputted to the comparator 620. The predetermined threshold value is set to the appropriate value experientially or experimentally as a reference value for extending the latency of access requests to the memory subsystem 30, thereby reducing the impact on the performance of the system (CPU) and reducing power consumption. When the inputted count value is less than the predetermined threshold value, the comparator 620 outputs a high (H) signal as an output signal. It outputs a low (L) signal when the inputted count value is equal to or greater than the threshold value. A high (H) signal and a low (L) signal correspond, respectively, to a high and low access request frequency to the memory subsystem 30, or the occupancy. In FIG. 2, there is a plurality of registers 610 and comparators 620. However, a single one of each can also be used.

Output signals from the comparator 620 are inputted to a clock gate circuit 630, a WAIT insertion circuit 640, and a CKE gate circuit 650. The clock gate circuit 630 receives a high (H) signal from the comparator 620, and outputs a gate signal to an AND gate 660 to decimate the operating clock of the memory controller 310. The AND gate 660 receives a clock signal from the system bus 10, and outputs another clock signal to the memory controller 310 only when the gate signal from the clock gate circuit 630 is high (H). In this way, the clock can be decimated while the gate signal is low (L).

The WAIT insertion circuit 640 receives a high (H) signal from the comparator 620, and outputs dummy cycle signals to the memory controller 310 to delay the timing of the signal (data) output from the memory controller 310 to the system bus 10. Dummy cycle signals are bit sequence signals with a predetermined cycle. The memory controller 310 delays signal (data) output to the system bus 10 only during the interval with dummy cycle signals.

The CKE gate circuit 650 receives high (H) signals from the comparator 620, and outputs gate signals to the AND gate 670 to decimate the operating clock of the DDR memory 330. The AND gate 670 receives clock enable (CKE) signals for the DDR memory 330 from the memory controller 310, and outputs CKE signals (high) to the DDR memory 330 only when the CKE gate signals from the CKE gate circuit 650 are high (H). In this way, CKE signals can be forced low (L) and the operating clock of the DDR memory 330 decimated while the CKE gate signals are low (L).

The clock gate circuit 630, the WAIT insertion circuit 640, and the CKE gate circuit 650 can receive output signals from the comparator 620, and all three can operate simultaneously. One or two of them can also be selectively operated. Selective operation can be realized by selectively outputting signal from the comparator 620 in a manner corresponding to the circuits to be operated, or by inputting output signals only to the circuits to be operated.

As described above, the present invention proposes a power saving mechanism in which the operating state of the memory subsystem is monitored instead of monitoring the operating state of the CPU/GPU. The idle state of the CPU can be estimated as high when the occupancy of the memory access from the CPU in the system bus is low. In this case, the impact on system performance is low even when the latency of memory access has been extended. Even when the CPU is not in an idle state, the occupancy of the memory bus is believed to be low due to the high cache hit rate. Because the process is internal to the CPU, there is very little impact on system performance, even when there is a decrease in non-CPU performance, such as memory subsystem performance.

Embodiments of the present invention were explained with reference to the drawings. However, the present invention is not limited to these embodiments. The present invention can be embodied in a manner that includes various improvements, modifications and variations based on the knowledge of those skilled in the art without departing from the scope of the invention.

We claim:

1. A method comprising:
    estimating an access request frequency from a CPU to a memory subsystem by counting a number of CPU access requests and a number of requests other than CPU access requests, wherein a CPU access request is counted as plus one (+1) and a request other than a CPU access request and a system bus idle state are each counted as minus one (−1), wherein the CPU is connected to the memory subsystem via a system bus, and the memory subsystem comprises a DDR memory and a memory controller connected to the system bus;
    comparing the estimated access request frequency with a predetermined threshold value stored in a register;
    generating a clock gate signal to decimate an operating clock of the memory controller in response to a result of comparing the estimated access request frequency with the predetermined threshold value;
    generating a dummy cycle signal to delay the timing of signal data output from the memory controller to the system bus in response to the result of comparing the estimated access request frequency with the predetermined threshold value; and
    generating a clock enable signal to decimate an operating clock of the DDR memory in response to the result of comparing the estimated access request frequency with the predetermined threshold value.

2. The method of claim 1, wherein the estimated access request frequency is zero for all negative results obtained by counting the number of CPU access requests and the number of requests other than CPU access requests.

3. The method of claim 1, wherein the result of comparing the estimated access request frequency with the predetermined threshold value is a high signal when the estimated access request frequency is less than the predetermined threshold value stored in the register, the high signal corresponds to a high access request frequency to the memory subsystem.

4. The method of claim 1, wherein the result of comparing the estimated access request frequency with the predetermined threshold value is a low signal when the estimated access request frequency is equal to or greater than the predetermined threshold value stored in the register, the low signal corresponds to a low access request frequency to the memory subsystem.

5. The method of claim 1, wherein generating the clock gate signal to decimate the operating clock of the memory controller comprises:
receiving an output signal based on the result of comparing the estimated access request frequency with the predetermined threshold value.

6. The method of claim 5, wherein generating the clock gate signal to decimate the operating clock of the memory controller comprises:
outputting the clock gate signal to an AND gate to decimate the operating clock of the memory controller, and wherein the AND gate receives a clock signal from the system bus, and outputs another clock signal to the memory controller only when the clock gate signal is high, such that the operating clock of the memory controller can be decimated while the clock gate signal is low.

7. The method of claim 1, wherein generating the dummy cycle signal to delay the timing of the signal data output from the memory controller to the system bus comprises:
receiving an output signal based on the result of comparing the estimated access request frequency with the predetermined threshold value.

8. The method of claim 7, wherein generating the dummy cycle signal to delay the timing of the signal data output from the memory controller to the system bus comprises:
outputting the dummy cycle signal to the memory controller to delay the timing of the signal data output from the memory controller to the system bus, wherein the dummy cycle signal is a bit sequence signals with a predetermined cycle.

9. The method of claim 1, wherein generating the clock enable signal to decimate the operating clock of the DDR memory comprises:
receiving an output signal based on the result of comparing the estimated access request frequency with the predetermined threshold value.

10. The method of claim 9, wherein generating the clock enable signal to decimate the operating clock of the DDR memory comprises:
outputting the clock enable signal to an AND gate to decimate the operating clock of the DDR memory, the AND gate receives the clock enable signal for the DDR memory from the memory controller, and outputs a high clock enable signal to the DDR memory only when the clock gate signal is high.

11. A method comprising:
estimating an access request frequency from a CPU to a memory subsystem by counting a number of CPU access requests and a number of requests other than CPU access requests, wherein a CPU access request is counted as plus one (+1) and a request other than a CPU access request and a system bus idle state are each counted as minus one (−1), wherein the CPU is connected to the memory subsystem via a system bus, and the memory subsystem comprises a DDR memory and a memory controller connected to the system bus;
comparing the estimated access request frequency with a predetermined threshold value stored in a register;
receiving an output signal based on a result of comparing the estimated access request frequency with the predetermined threshold value;
outputting a clock gate signal to a first AND gate to decimate an operating clock of the memory controller, and wherein the first AND gate receives a clock signal from the system bus, and outputs another clock signal to the memory controller only when the clock gate signal is high, such that the operating clock of the memory controller can be decimated while the clock gate signal is low;
receiving the output signal based on the result of comparing the estimated access request frequency with the predetermined threshold value;
outputting a dummy cycle signal to the memory controller to delay the timing of signal data output from the memory controller to the system bus, wherein the dummy cycle signal is a bit sequence signals with a predetermined cycle;
receiving the output signal based on the result of comparing the estimated access request frequency with the predetermined threshold value; and
outputting a clock enable signal to a second AND gate to decimate an operating clock of the DDR memory, the second AND gate receives the clock enable signal for the DDR memory from the memory controller, and outputs a high clock enable signal to the DDR memory only when the clock gate signal is high.

12. The method of claim 11, wherein the estimated access request frequency is zero for all negative results obtained by counting the number of CPU access requests and the number of requests other than CPU access requests.

13. The method of claim 11, wherein the result of comparing the estimated access request frequency with the predetermined threshold value is a high signal when the estimated access request frequency is less than the predetermined threshold value stored in the register, the high signal corresponds to a high access request frequency to the memory subsystem.

14. The method of claim 11, wherein the result of comparing the estimated access request frequency with the predetermined threshold value is a low signal when the estimated access request frequency is equal to or greater than the predetermined threshold value stored in the register, the low signal corresponds to a low access request frequency to the memory subsystem.

15. A method comprising:
estimating an access request frequency from a CPU to a memory subsystem by counting a number of CPU access requests and a number of requests other than CPU access requests, wherein a CPU access request is counted as plus one (+1) and a request other than a CPU access request and a system bus idle state are each counted as minus one (−1), wherein the CPU is connected to the memory subsystem via a system bus, and the memory subsystem comprises a DDR memory and a memory controller connected to the system bus;
comparing the estimated access request frequency with a predetermined threshold value stored in a register;

receiving an output signal based on a result of comparing the estimated access request frequency with the predetermined threshold value; and outputting a clock gate signal to a first AND gate to decimate an operating clock of the memory controller, and wherein the first AND gate receives a clock signal from the system bus, and outputs another clock signal to the memory controller only when the clock gate signal is high, such that the operating clock of the memory controller can be decimated while the clock gate signal is low.

16. The method of claim 15, wherein the estimated access request frequency is zero for all negative results obtained by counting the number of CPU access requests and the number of requests other than CPU access requests.

17. The method of claim 15, wherein the result of comparing the estimated access request frequency with the predetermined threshold value is a high signal when the estimated access request frequency is less than the predetermined threshold value stored in the register, the high signal corresponds to a high access request frequency to the memory subsystem.

18. The method of claim 15, wherein the result of comparing the estimated access request frequency with the predetermined threshold value is a low signal when the estimated access request frequency is equal to or greater than the predetermined threshold value stored in the register, the low signal corresponds to a low access request frequency to the memory subsystem.

19. The method of claim 15, further comprising:

receiving the output signal based on the result of comparing the estimated access request frequency with the predetermined threshold value; and outputting a dummy cycle signal to the memory controller to delay the timing of signal data output from the memory controller to the system bus, wherein the dummy cycle signal is a bit sequence signals with a predetermined cycle.

20. The method of claim 15, further comprising:

receiving the output signal based on the result of comparing the estimated access request frequency with the predetermined threshold value; and outputting a clock enable signal to a second AND gate to decimate the operating clock of the DDR memory, the second AND gate receives the clock enable signal for the DDR memory from the memory controller, and outputs a high clock enable signal to the DDR memory only when the clock gate signal is high.

* * * * *